Figure 1:
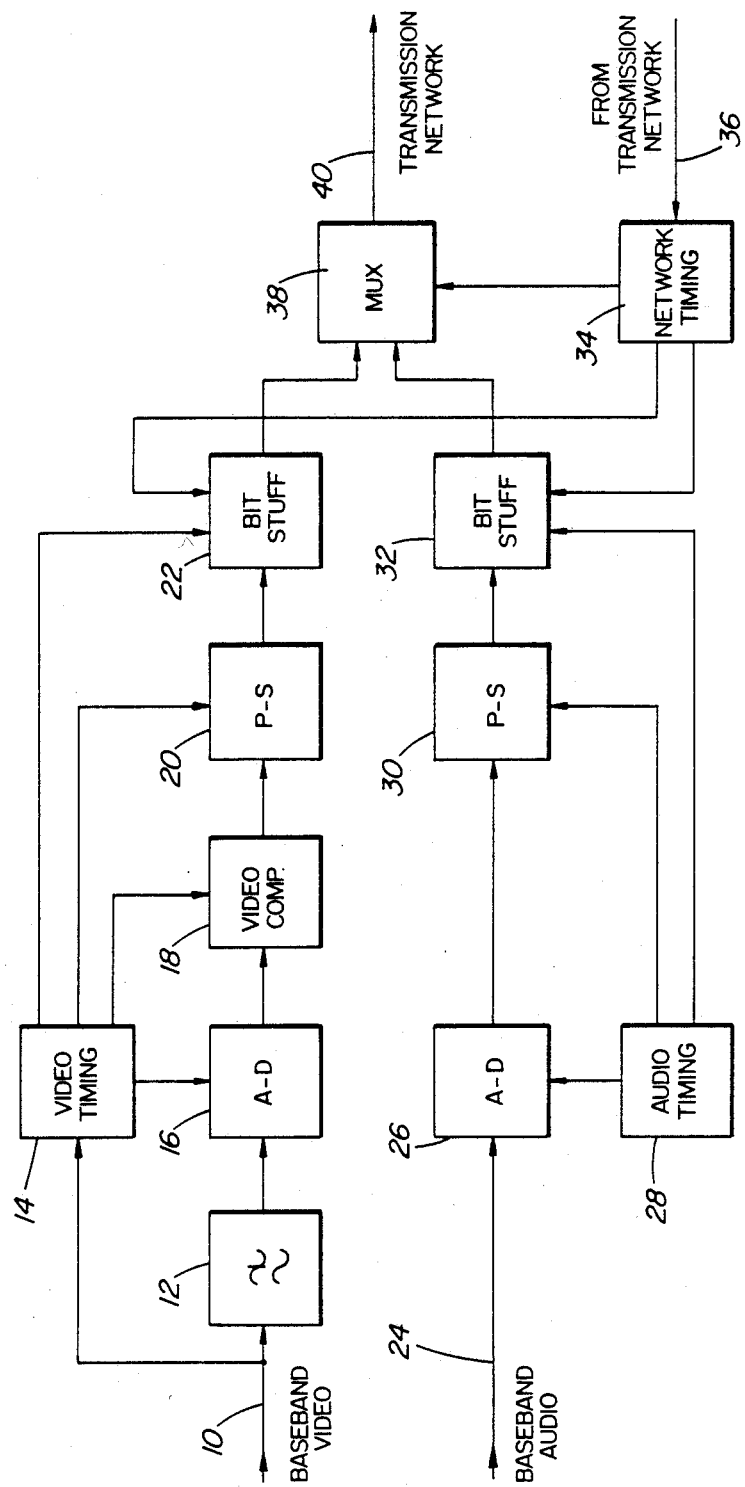

United States Patent [19]

Graves

[11] Patent Number: 4,825,286

[45] Date of Patent: Apr. 25, 1989

[54] DIGITIZATION OF VIDEO SIGNALS

[75] Inventor: Alan F. Graves, Kanata, Canada

[73] Assignee: Northern Telecom Limited, Montreal, Canada

[21] Appl. No.: 246,066

[22] Filed: Sep. 19, 1988

[30] Foreign Application Priority Data

Aug. 4, 1988 [CA] Canada .................................. 573872

[51] Int. Cl.⁴ .............................................. H04N 7/04
[52] U.S. Cl. ...................................... 358/143; 358/142; 358/144; 358/12
[58] Field of Search ................. 358/142, 143, 144, 12, 358/14, 15, 901, 86

[56] References Cited

U.S. PATENT DOCUMENTS 4,544,950 10/1985 Tu ....................................... 358/143

OTHER PUBLICATIONS

Article entitled "Digital Video Transmission in Optical Fiber Networks", by Krish A. Prabhu, FPN (Fiber Product News), Mar. 1988, pp. 28 to 37.

Primary Examiner—James J. Groody
Assistant Examiner—Michael D. Parker
Attorney, Agent, or Firm—R. John Haley

[57] ABSTRACT

A band limited composite video television signal has summed with it, at a reduced amplitude, a frequency modulated audio carrier signal at a higher frequency. The sum signal is sampled and digitized at a sampling frequency which is at least twice the audio carrier frequency and is more than three times the frequency of a color subcarrier in the composite video signal, and is not related thereto. The sampling frequency is derived from a transmission network, whereby stuffing of the digitized signal for transmission is eliminated, and multiplexing of several digitized signals is facilitated. At a decoder, the digital signal is converted back into an analog signal and the audio carrier signal amplitude boosted using filtering. Picture quality of a reproduced television signal is enhanced in that quantizing noise in the video signal becomes uncorrelated from line to line and frame to frame, due to dithering effects by the audio carrier signal.

36 Claims, 6 Drawing Sheets

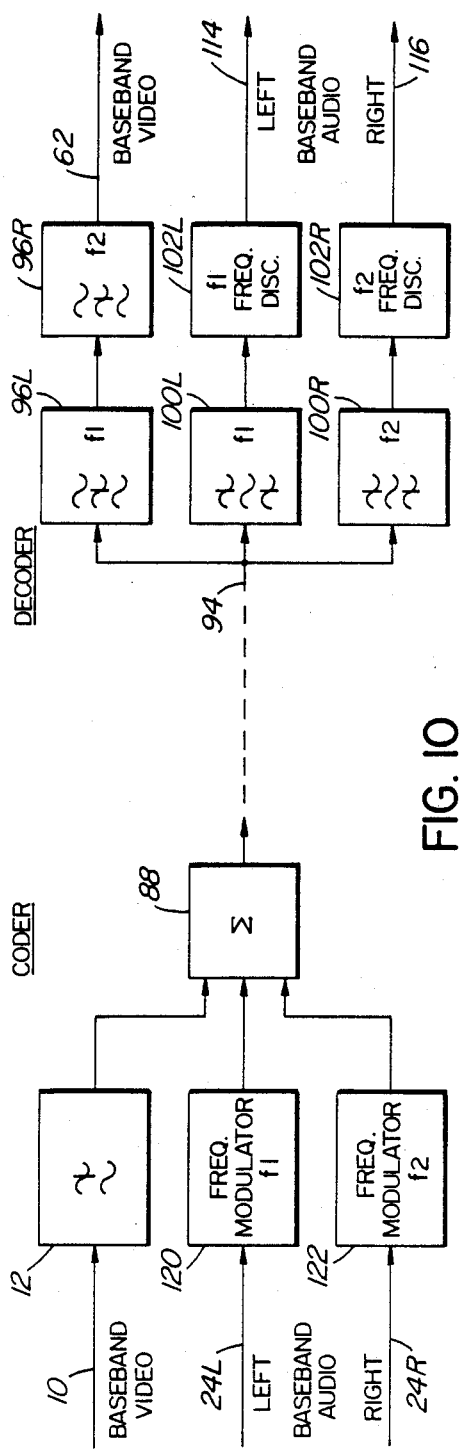
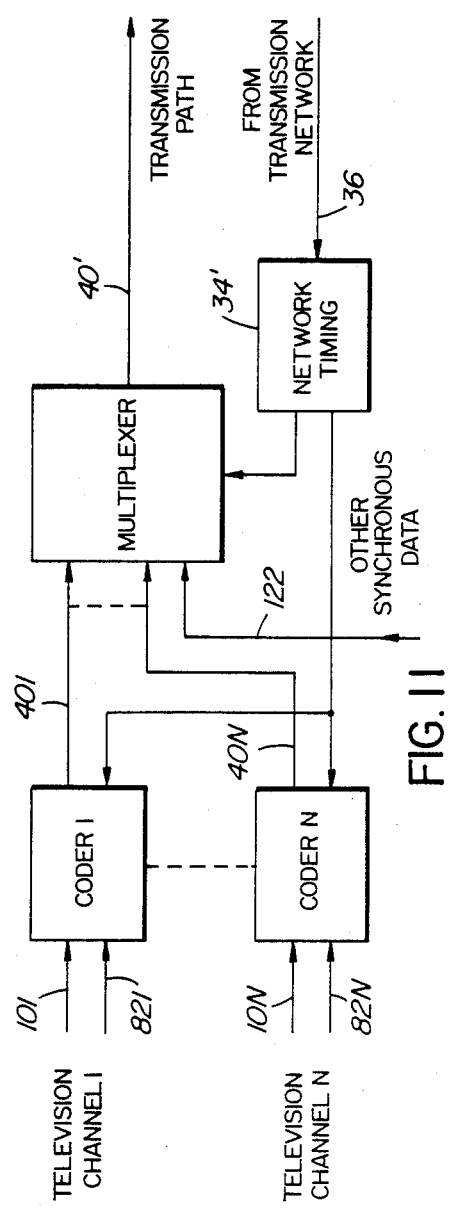
FIG. 10
FIG. 11

DIGITIZATION OF VIDEO SIGNALS

This invention relates to the digitization of video signals, and in particular is concerned with the conversion into digital form of composite video television signals in a manner which is particularly convenient for transmission via a transmission network, which may in particular comprise an optical fiber transmission path.

An article entitled "Digital Video Transmission in Optical Fiber Networks" by Krish A. Prabhu, FPN (Fiber Product News), March 1988, pages 28 to 37 describes known techniques for digital transmission of television signals. In such techniques, typically the composite video signal is converted into 8-bit digital signal samples at a sampling frequency locked to three times the color subcarrier frequency (i.e. at a total bit rate of 8 bits/sample times 3 times 3.58 MHz for NTSC, or 85.92 Mb/s), these may be compressed with a 2:1 compression ratio to a bit rate of 42.96 Mb/s, each baseband audio signal is converted into digital signal samples each of 14 to 16 bits at a sampling frequency of typically 32.9 kHz to provide a bit rate of about 1 Mb/s for two stereo audio channels, and the digital signals are stuffed and multiplexed for transmission as a serial bit stream for example at a DS3 transmission rate of nominally 44.736 Mb/s. A decoder performs the inverse of these steps to reproduce a conventional television signal at a receiver.

Such known techniques require a substantial amount of equipment both for coding and decoding, with consequently relatively high costs and complexity. In addition, these known techniques require frequency modulation of the decoded baseband audio signal onto an audio carrier signal, typically at 4.5 MHz, and mixing of this with the decoded video signal, prior to RF (radio frequency) modulation onto a standard television carrier, if a conventional radio frequency output to a television is required. In conventional broadcast transmission the audio carrier signal is harmonically related to the video line rate in order to minimize visual impairments by rendering them nominally motionless in the picture, the human eye being relatively insensitive to non-moving large-area impairments. However, this is too complicated to reproduce economically at the receiver so that impairments may occur due to the use of an audio carrier produced by a free-running (4.5 MHz) oscillator, such impairments having the form of slowing moving bands in the television picture.

An object of this invention, therefore, is to provide an improved method of processing a video signal for digital transmission.

According to one aspect this invention provides a method of converting an analog video signal within a predetermined bandwidth into a digital signal, comprising the steps of: combining with the analog video signal a second signal having a frequency greater than the predetermined bandwidth to produce a combined signal; and converting into a digital signal samples of the combined signal at a sampling frequency which is at least twice the frequency of the second signal.

The second signal desirably has a much smaller amplitude than that of the video signal. Preferably a peak-to-peak amplitude ratio of the analog video signal to the second signal is in a range from about 15 dB to about 40 dB, and is conveniently in a range from about 20 dB to about 30 dB. The choice of amplitude ratio is not critical, but a ratio in the above range is preferred because it does not excessively reduce the number of digital signal levels which, for a given number of bits per sample, are available for representing the video signal component, and it ensures a sufficient amplitude of the second signal to produce a high frequency dithering of the video signal whereby quantization noise is subjectively reduced in the reproduced video signal. The term "dithering" is used herein in a technical sense to refer to a useful oscillation of the video signal at a relatively high frequency and at a relatively small amplitude.

Applied to a television signal, the analog video signal may be constituted by a composite video signal and the second signal may be a carrier signal frequency modulated with an audio signal. Preferably, therefore, the analog video signal includes a color signal component having a predetermined frequency and the sampling frequency is unrelated to the predetermined frequency. Desirably, the sampling frequency is more than three times the predetermined frequency, and conveniently is in a range from about 12.5 MHz to about 14.4 MHz for an NTSC television signal.

Because the sampling frequency is not locked to the color signal (subcarrier) frequency, it can be derived from any suitable source. Preferably it is derived from a transmission network via which the digital signal is to be transmitted. This eliminates the need for stuffing of the digital signal for transmission, and simplifies multiplexing of multiple digitized signals via a common transmission path. This is particularly advantageous for simultaneous transmission of a plurality of television channels via a single optical fiber to a residence.

According to another aspect, this invention provides a method of processing a composite video signal for digital transmission, the signal having a predetermined bandwidth and including a color signal component having a predetermined frequency, comprising the steps of: summing the video signal with an audio carrier signal, having a frequency greater than the predetermined bandwidth and having a peak-to-peak amplitude much less than that of the video signal, to produce a summed signal; and digitizing samples of the summed signal at a sampling frequency which is at least twice the audio carrier signal frequency and is unrelated to the color signal component frequency.

Preferably a peak-to-peak amplitude ratio of the video signal to the audio carrier signal is at least about 15 dB, and the sampling frequency is more than three times the color signal component frequency.

For stereo audio television signal channels, either the audio carrier signal can be modulated with a conventional multiplexed stereo audio signal (e.g. BTSC), or the video signal can be summed with two audio carrier signals each having a respective frequency greater than the predetermined bandwidth, and a peak-to-peak amplitude much less than that of the video signal, each such audio carrier signal being frequency modulated with a respective one of two channels of a stereo audio signal. The latter arrangement eliminates the need for a stereo decoder in the television receiver but necessitates the provision of a second RF limiter/discriminator.

The invention also provides a video coder comprising: means for supplying a composite video signal within a predetermined bandwidth; means for supplying a carrier signal modulated with an audio signal, the carrier signal having a frequency greater than the predetermined bandwidth; means for summing the video signal with the carrier signal with a peak-to-peak amplitude ratio of the video signal to the carrier signal of at least about 15 dB to produce a summed signal; and means for converting the summed signal into a digital signal with digitized samples at a sampling frequency of at least twice the carrier signal frequency. The peak-to-peak ratio of at least about 15 dB is such that the video signal amplitude is significantly greater than the audio carrier amplitude, so that relatively few digital signal levels are given up by the former to accommodate the latter.

Conveniently the means for converting comprises means for deriving a signal at the sampling frequency from a transmission network for transmission of the digital signal.

This invention further provides a video decoder for decoding a digital signal comprising digitized samples of a summed signal comprising a composite video signal within a predetermined bandwidth summed with an audio carrier signal having a frequency greater than the predetermined bandwidth and a peak-to-peak amplitude much less than that of the composite video signal, the samples occurring at a sampling frequency which is at least twice the audio carrier signal frequency, the decoder comprising: means for converting the digitized samples into analog signal samples at the sampling frequency; means for low pass filtering the analog signal samples to produce an analog signal; and means for increasing the peak-to-peak amplitude of components of the analog signal at the audio carrier signal frequency relative to the peak-to-peak amplitude of components of the analog signal at frequencies within the predetermined bandwidth.

Such video coders and decoders are considerably simpler and less expensive than coders and decoders in accordance with prior art techniques. Furthermore, they preserve the audio carrier frequency from the head or originating end to the receiving end, so that this does not need to be generated independently at the decoder and the potential impairments of the prior art due to such generation are avoided. Furthermore, the dithering of the video signal due to the higher frequency audio carrier enhances the subjective quality of the reproduced video signal, by rendering quantization noise less noticeable. Thus even though the audio carrier summing reduces the number of digital levels effectively available for representing the video signal, the picture quality is subjectively improved.

The above improvement in reproduced picture quality is sufficient to enable a reduced number of digital signal levels to be used for representing the video signal, whilst still achieving a picture quality comparable to that of the prior art. Alternatively, it is conceivable that the same method could be applied to video coders using existing techniques to achieve a subjectively enhanced picture quality. The second signal which is summed with the video signal in this case may be, but need not necessarily be, related to an audio carrier signal of the television channel.

The invention also provides a method of transmitting via a digital transmission path a video signal including a color signal component having a predetermined first frequency, the video signal and the first frequency being within a predetermined bandwidth, comprising the steps of: combining the video signal with a second signal having a second frequency greater than the predetermined bandwidth to produce a combined signal; sampling the combined signal at a third frequency related to a transmission rate on the digital transmission path; converting samples of the combined signal into a digital signal; and transmitting the digital signal via the digital transmission path; wherein the third frequency is more than about three times the first frequency and at least twice the second frequency.

According to a further aspect, this invention provides a method of processing a plurality of video signals for transmission via a digital transmission path, each video signal including a color subcarrier having a first frequency, comprising the steps of: sampling each video signal at a frequency synchronously related to a transmission rate on the digital transmission path; converting samples of the video signals into digital signals; and synchronously multiplexing the digital signal samples of the video signals for transmission via the digital transmission path; wherein the frequency synchronously related to a transmission rate on the digital transmission path is more than about three times the first frequency.

Figure 2:
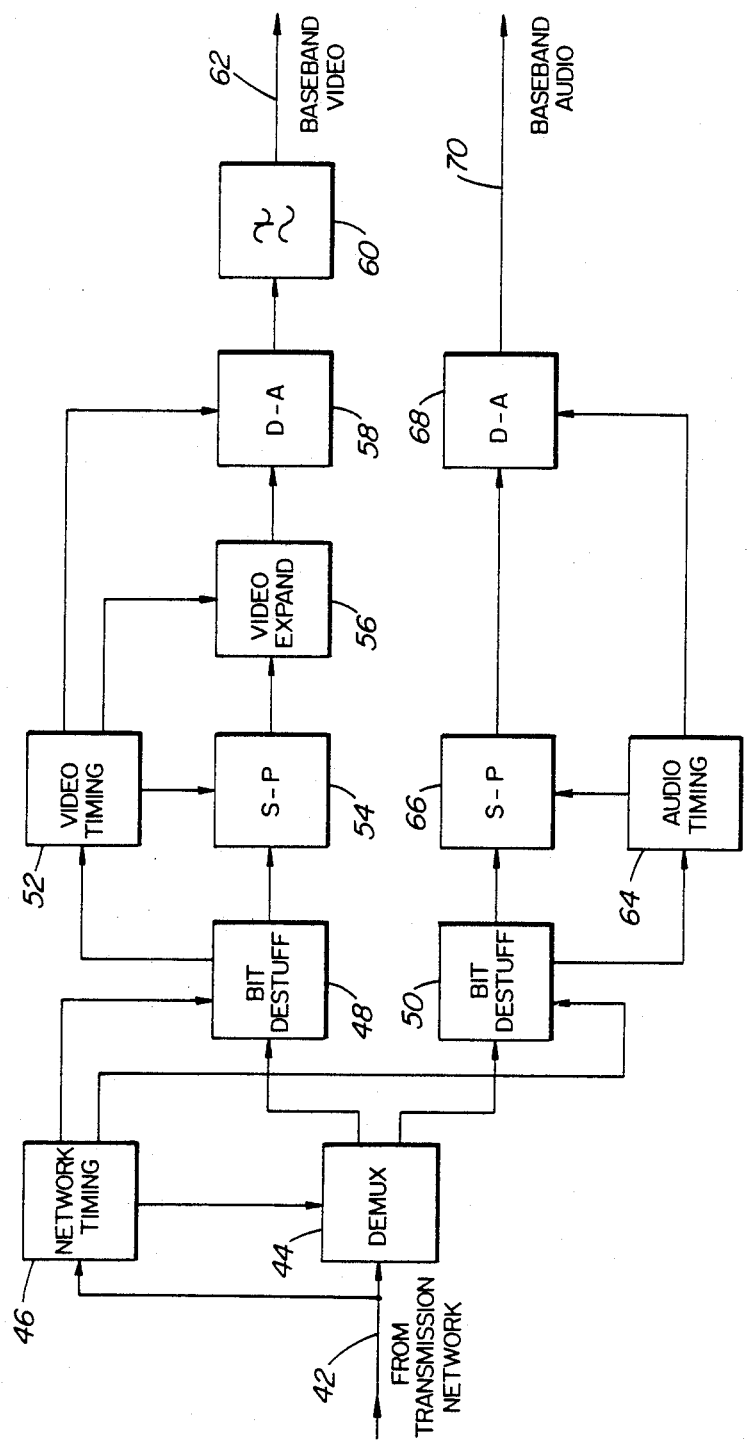
Figure 3:
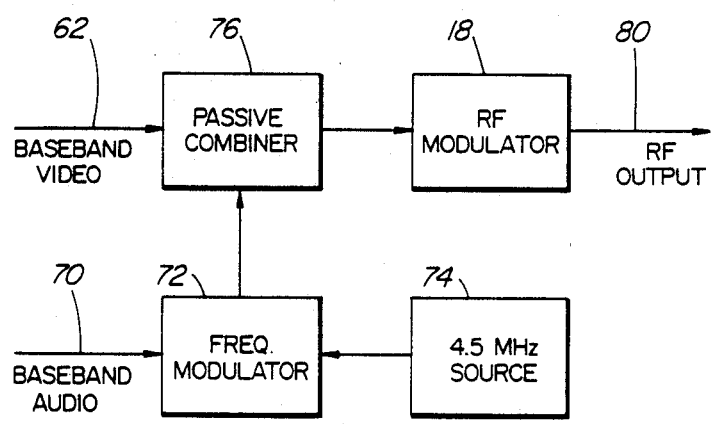
Figure 4:
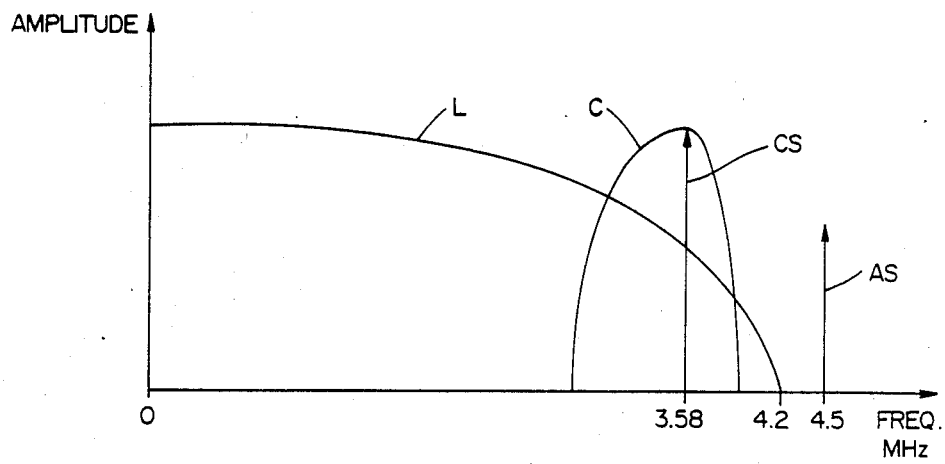
Figure 5:
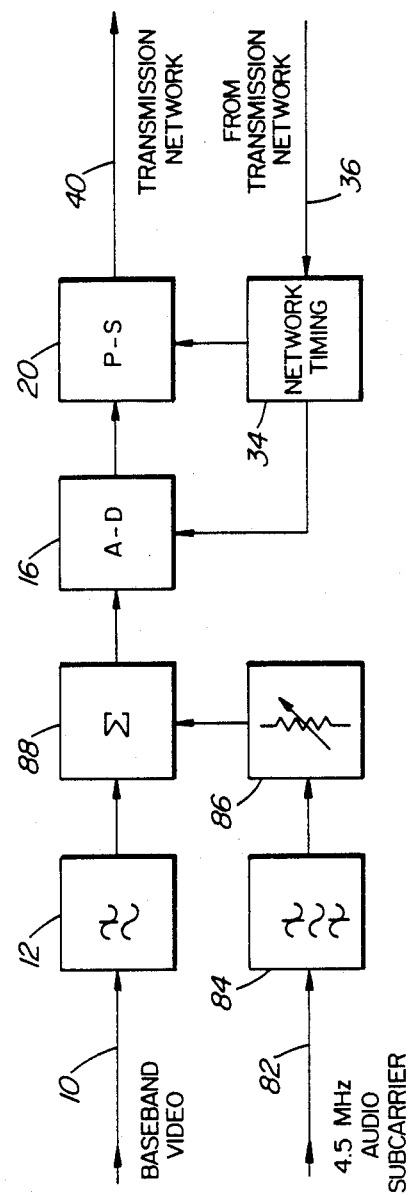
Figure 6:
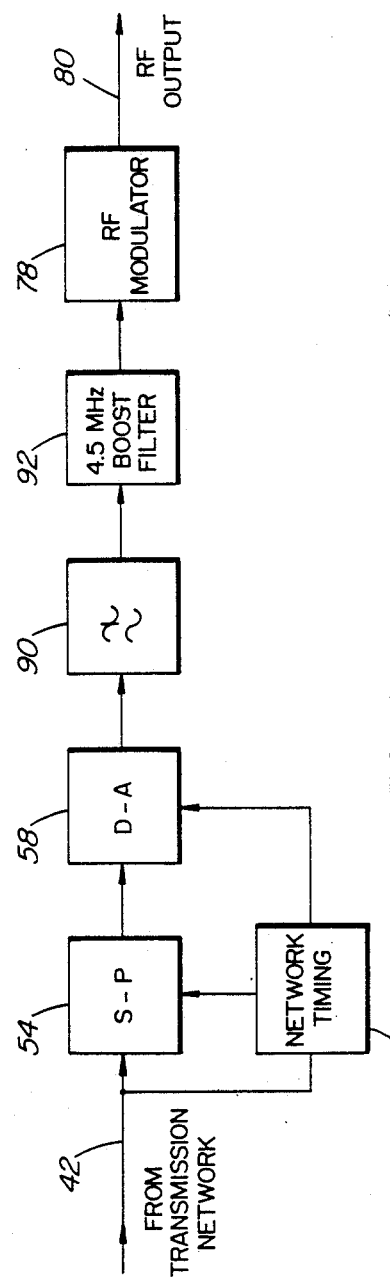
Figure 7:
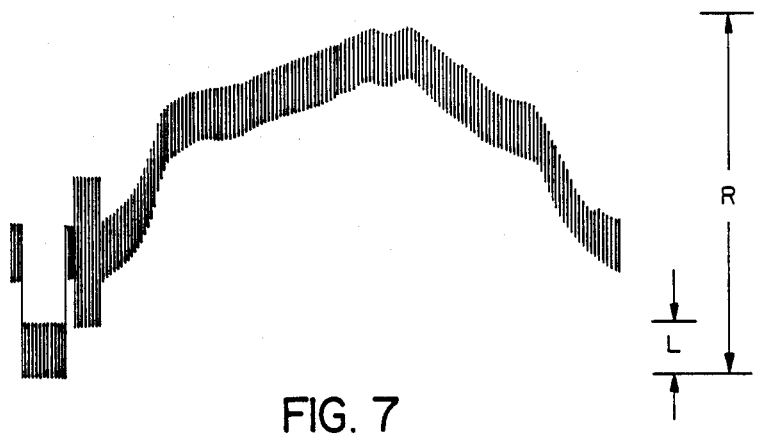
Figure 8:
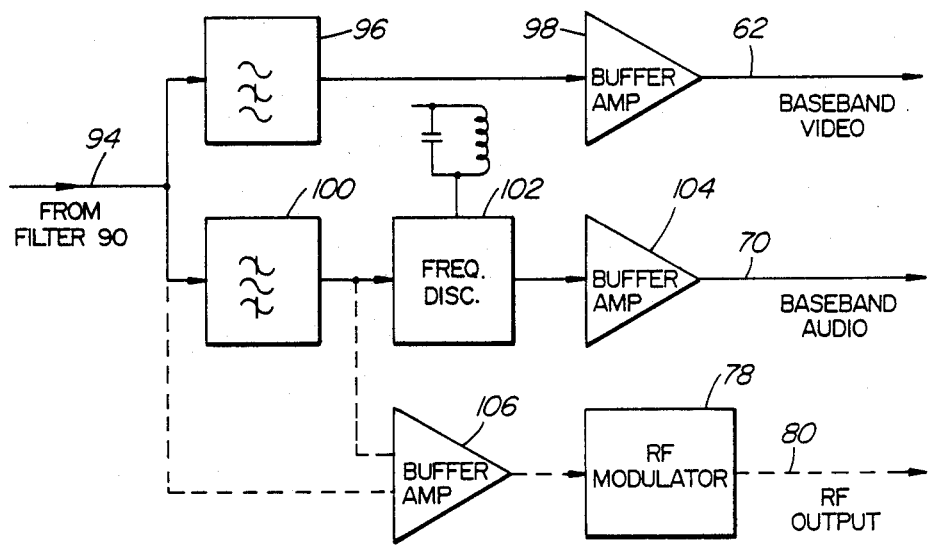
Figure 9:
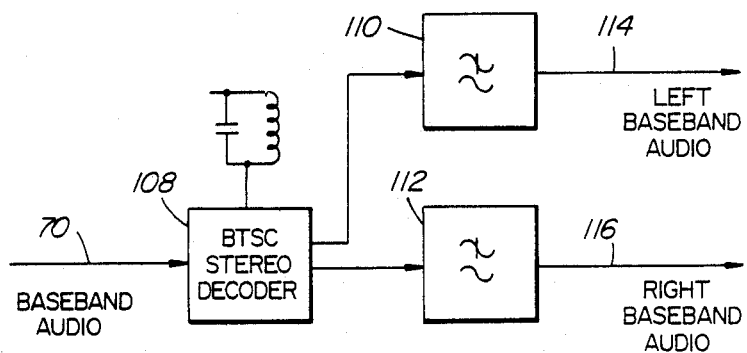

The invention will be further understood from the following description with reference to the accompanying drawings, in which:

FIG. 1 schematically illustrates a known form of coder for encoding television signals for digital transmission;

FIG. 2 schematically illustrates a known form of decoder for decoding such signals;

FIG. 3 schematically illustrates a known remodulation arrangement for use with the decoder of FIG. 2;

FIG. 4 is an amplitude-frequency diagram illustrating components of an NTSC television signal;

FIG. 5 schematically illustrates a coder for encoding television signals for digital transmission in accordance with an embodiment of this invention;

FIG. 6 schematically illustrates a decoder for decoding signals encoded by the coder of FIG. 5;

FIG. 7 illustrates, for one horizontal line of a video signal, a combined audio carrier and composite video signal which is produced in operation of the coder of FIG. 5;

FIG. 8 schematically illustrates an alternative arrangement of parts of the decoder of FIG. 6;

FIG. 9 schematically illustrates a supplementary arrangement for decoding stereo audio signals;

FIG. 10 schematically illustrates an alternative arrangement of parts of the coder of FIG. 5 and the decoder of FIG. 6 for accommodating stereo audio signals; and FIG. 11 schematically illustrates an arrangement for encoding and multiplexing a plurality of television channel signals.

FIGS. 1 to 3 show components of an encoder and decoder which may be used in the prior art for converting a television signal into a digital form, for transmission via a transmission network, and back into a conventional form for reproduction on a conventional television set. FIG. 4 illustrates the known components of the television signal, which is assumed here to be an NTSC signal although the invention is not limited in this respect.

Referring initially to FIG. 4, an NTSC composite video signal at baseband has a luminance component L extending in a frequency range from 0 to 4.2 MHz, and chroma sidebands C with an associated chroma subcarrier CS at a frequency of 3.579545 MHz. An associated audio signal component AS is provided at a subcarrier frequency of 4.5 MHz.

In the prior art coder of FIG. 1, the baseband composite video signal (components L, C, and CS) is supplied via a line 10 to a low pass filter 12, which acts as an anti-aliasing filter and has a sharp upper cut-off frequency just above the video bandwidth of 4.2 MHz, and to a video timing recovery circuit 14. The circuit 14 is synchronized by the chroma subcarrier CS of the video signal, to a frequency which is an integral multiple of typically three times this subcarrier frequency, i.e. to a frequency of 10.74 MHz. The circuit 14 supplies clocking signals at this frequency, locked to the chroma subcarrier frequency, to an analog-digital (A-D) converter 16, and related timing signals to subsequent circuits including an optional video signal compressor 18, a parallel-serial (P-S) converter 20, and a bit stuffing circuit 22.

It should be appreciated that a significant reason for operating the A-D converter 16 at an integral multiple of the chroma subcarrier frequency is that the discrete sampling periods, associated with the A-D conversion process, introduce phase noise and distortion on the chroma subcarrier SC which is already phase and amplitude modulated to carry the color information. Hence the phase noise and distortion introduced by the sampling results in color noise and distortion. By locking the sampling rate to an integral multiple of the chroma subcarrier frequency this color noise and distortion become non-moving in the reproduced television picture; in other words the impairments are static and relatively unnoticeable to the human eye. A further reason is that operation at such a frequency reduces the noticeability of impairments introduced as a result of the optional video compression discussed below, and simplifies the video compression circuitry.

The A-D converter 16 typically produces 8 bits per sample, to produce a total bit rate at its output of about 86 Mb/s. This is optionally compressed, typically with a 2:1 compression ratio using transform or differential pulse code modulation coding, by the video signal compressor 8, and the resulting signal is converted into a serial bit stream by the P-S converter 20. Details of the compressor 18 are unnecessary here, as compressors are known in themselves and do not concern this invention.

The above-described processing relates only to the video signal components. The baseband audio signal, which in the diagram of FIG. 4 would be modulated onto the audio subcarrier AS, is processed completely separately. This baseband audio signal is supplied via a line 24 to an A-D converter 26, which is operated at a sampling frequency of for example 32.9 kHz supplied by an audio timing circuit 28, to produce a 14- to 16-bit digitized audio signal at its output. This number of bits per sample is necessary to provide a desired signal-to-noise ratio of the audio signal, and the sampling frequency is sufficient to provide an audio signal bandwidth of 16 kHz. The circuit 28 also provides timing signals to a following P-S converter 30, which produces a serial digitized audio signal bit stream, and to a subsequent bit stuffing circuit 32. As the audio signal bit stream has a bit rate of about 0.5 Mb/s, which may be doubled for stereo audio channels but in any event is very much less than the video signal bit rate, there is no need for an audio signal compressor.

For transmission, the digitized video and audio signals must be multiplexed together and matched to the transmission speed of the transmission network. To this end, a network timing recovery circuit 34 is provided, synchronized to the network timing via a line 36, for controlling output of the digitized video and audio signals from the bit stuffing circuits 22 and 32 respectively via a multiplexer 38 and a transmission line 40. The circuits 22 and 32 perform variable bit stuffing of the respective serial bit streams in well-known manner.

The prior art decoder of FIG. 2 operates in a converse manner. The transmitted signal is supplied from the transmission network via a line 42 to a demultiplexer 44 and to a network timing recovery circuit 46, which recovers network timing and controls the demultiplexer 44 and bit destuffing circuits 48 and 50 to which the digital video and audio signal bit streams, respectively, are supplied. A video timing recovery circuit 52 recovers timing information from the video signal chroma subcarrier component and controls a serial-parallel (S-P) converter 54 for converting the serial destuffed output of the circuit 48 into 8-bit parallel form, an optional video expander 56 which operates conversely to the compressor 18, and a digital-analog (D-A) converter 58 for producing an analog video signal which is filtered by a low-pass 4.2 MHz filter 60 to reproduce a baseband video signal on a line 62. An audio timing recovery circuit 64 recovers timing information from the audio signal component and controls an S-P converter 66 and a D-A converter 68 to reproduce a baseband audio signal on a line 70.

The known circuit of FIG. 3 can be used to produce a conventional radio frequency (RF) signal from the signals on the lines 62 and 70. The audio signal on the line 70 is frequency modulated in a frequency modulator 72 with a 4.5 MHz signal supplied by a source 74 to produce an audio carrier signal corresponding to the audio subcarrier signal AS, and this is combined with the video signal on the line 62 in a passive combiner 76 and modulated to a desired frequency by an RF modulator 78 to produce a RF output on a line 80.

From the above description of the prior art, it should be appreciated that the known manner of transmitting a television signal via a digital transmission channel is relatively complex. In particular, significant circuitry and consequent expense is required for stuffing and multiplexing the video and audio signals at the coder, and for destuffing and demultiplexing at the decoder. Furthermore, the video and audio signal components are processed separately, requiring for example separate A-D converters, timing circuits, and P-S converters in the coder, and separate D-A converters, timing circuits, and S-P converters in the decoder.

The complexity of the prior art coder and decoder arises to a significant extent from the necessary synchronism of the coder sampling rate to a harmonic of the color subcarrier frequency. This synchronism makes phase shifts in the color subcarrier, due to the finite sampling rate, static and hence less noticeable in the reproduced television picture.

FIG. 5 illustrates a coder in accordance with an embodiment of the invention, using similar references to those used above to denote similar components. More particularly, the coder of FIG. 5 includes signal lines 10, 36, and 40, an anti-aliasing low pass filter 12, 8-bit A-D converter 16, P-S converter 20, and network timing circuit 34 which are generally as described above. In addition, the coder of FIG. 5 comprises an audio subcarrier input signal line 82, a 4.5 MHz bandpass filter 84, an attenuator 86, and a summer 88. It can be seen clearly that the coder of FIG. 5 has far fewer components and far less complexity than the coder of FIG. 1 even without the video compressor of the latter coder.

In operation of the coder of FIG. 5, the baseband video signal on the line 10 is band limited to 4.2 MHz by the filter 12. The frequency modulated 4.5 MHz audio subcarrier signal on the line 82, which is typically derived directly from a broadcast television signal to be transmitted, is band limited by the filter 84, which has a narrow pass band centered at the audio subcarrier frequency of 4.5 MHz, and attenuated to a specific amplitude, as discussed further below, by the attenuator 86. The band limited video signal and the attenuated audio subcarrier signal are summed in the summer 88, the output of which is supplied as an input to the A-D converter 16. The attenuator 86 can be a simple resistive voltage divider and the summer 88 can conveniently comprise a summing amplifier.

Whereas in the coder of FIG. 1 and generally in the prior art the video A-D converter 16 is operated with a sampling rate synchronized by and phase locked with respect to the chroma subcarrier frequency, in the coder of FIG. 5 the A-D converter 16 is operated with a sampling rate which is determined by the transmission network timing, being controlled by the network timing recovery circuit 34, and which is unrelated to the chroma subcarrier frequency. The sampling rate is relatively high, typically between 3.5 and 4 times the chroma subcarrier frequency and 2.8 to 3.2 times the audio subcarrier frequency. Thus in the coder of FIG. 5 the A-D converter 16 sampling rate is typically in the range from about 12.5 MHz to about 14.4 MHz. By way of example, a sampling rate of 13.44 MHz is assumed here. This rate is determined by the transmission network and not by the color subcarrier frequency; it is 5.25 times a standard 2.56 MHz clock frequency and is synchronously related thereto.

Because the sampling rate or frequency of the A-D converter 16 in the coder of FIG. 5 is synchronized to the timing of the transmission network, the 8-bit output of the A-D converter 16 can be converted into a serial bit stream (at a bit rate of 107.52 Mb/s) by the P-S converter 20 and transmitted via the line 40 without any bit stuffing as in the prior art coder. Furthermore, this digitized video signal can be simply multiplexed, by bit or byte interleaving, with other digital signals which are similarly synchronous to the transmission network and which may include other similarly-encoded television channel signals, for example as described below with reference to FIG. 11.

Whereas in the prior art coder of FIG. 1 the baseband audio signal on the line 24 is digitized and consequently at least a 14-bit A-D converter is required for acceptable digitization of the audio signal, the coder of FIG. 5 digitizes (after attenuation and summing with the video signal as discussed below) the frequency modulated 4.5 MHz audio subcarrier signal on the line 82, which is also readily available from head-end equipment. As frequency modulated signals are insensitive to quantization noise, amplitude components of quantization noise being removed in the eventual frequency demodulation process at the television receiver, a much smaller number of digital signal levels (e.g. only 10 to 20 out of 256 levels for an 8-bit digital signal) can be used for digitizing the audio signal. Thus in the coder of FIG. 5 the 8-bit A-D converter 16 is entirely sufficient for digitizing the audio signal as well as the video signal.

The audio subcarrier signal on the line 82 typically has an amplitude of 300 mV peak-to-peak, about 10.5 dB below the video signal level of IV peak-to-peak, as supplied conventionally for broadcast transmission by CATV head-end equipment. In order to maximize the number of digital signal levels retained for representing the video signal, this is desirably reduced to about 120 mV peak-to-peak (18.4 dB below the video signal), or less, by the attenuator 86. In the summer 88, the reduced amplitude audio subcarrier signal is added to the baseband video signal, on which it superimposes a high frequency dither which serves to improve the reproduced video signal in that, as discussed further below, it breaks up quantizing steps of the video signal over a period of time. As also discussed below, this summing effectively reduces the number of quantizing levels available for the video signal. Consequently, the reduction in amplitude of the audio subcarrier signal by the attenuator 86 is selected as a compromise between providing an adequate number of levels for representing the 4.5 MHz audio carrier signal and avoiding deterioration of the video signal due to increased quantizing noise arising from the reduced number of levels for the video signal, to provide a subjectively optimum reproduced television signal while maintaining audio signal quality.

Obviously, the attenuator 86 can be incorporated into input weighting circuitry of the summer 88, or dispensed with if the audio subcarrier signal is supplied on the line 82 at a suitable level.

As already stated above, the A-D converter 16 is operated at a network-synchronous sampling rate of 13.44 MHz, providing a Nyquist bandwidth of 6.72 MHz which is more than sufficient to accommodate the audio subcarrier signal at 4.5 MHz, and is much greater than the 4.2 MHz bandwidth of the video signal. This high sampling rate results in a relatively high number of samples per cycle of the chroma subcarrier, whereby phase noise and distortion are reduced to negligible levels. Consequently, the need as in the prior art for sampling synchronously at a harmonic of the color subcarrier frequency is eliminated. As a result, the A-D converter 16 can instead be synchronized as described above to the network timing, to enable simple synchronous multiplexing of multiple digitized television signals for transmission via the network.

FIG. 6 illustrates a complementary decoder for converting a signal received from the transmission network via the line 42 into an RF modulated television signal output on the line 80. The decoder includes the network timing recovery circuit 46, S-P converter 54, 8-bit D-A converter 58 operated at the network-synchronous frequency of 13.44 MHz, and RF modulator 78 as described above. In addition, the decoder comprises a low pass filter 90 and a 4.5 MHz boost filter 92 coupling the output of the D-A converter 58 to the input of the RF modulator 78. The low pass filter 90 serves the same purpose as the filter 60 of the prior art decoder of FIG. 2, except that it has a wider bandwidth of about 5 MHz so that it also passes the 4.5 MHz audio subcarrier signal. The filter 92 provides a boost of the signal amplitude at the audio subcarrier frequency of 4.5 MHz, passing signals at other frequencies without any substantial change in amplitude, to compensate for the audio signal level attenuation provided in the coder by the attenuator 86. The filter 92 can comprise a simple peaking or resonant tuned circuit, and the functions of both of the filters 90 and 92 can conveniently be combined in a single filtering circuit.

It should be noted that the decoder of FIG. 6 contains far fewer components than the prior art decoder of FIG. 2 together with the remodulator of FIG. 3. It should also be appreciated that in the decoder of FIG. 6 there is no need to separate the audio and video signal components; these are supplied to the RF modulator 78 with the same relationship that they would have for direct input to an RF modulator in the absence of the coder, transmission network, and decoder.

In the coder of FIG. 5, the 256 digital values of the 8-bit A-D converter 16 are shared between the peak-to-peak video signal and the peak-to-peak audio subcarrier signal. Consequently, the number of digital values available for representing the video signal is reduced due to the addition of the audio signal, and the quantizing step size and hence quantizing noise of the video signal is increased. A lower level of the audio signal results in a smaller increase in video signal quantizing noise and easier sound carrier trapping of the video signal. FIG. 7 illustrates one horizontal scan line of a video signal with the audio subcarrier signal summed therewith, illustrating the range R of the D-A converter 16 and the range L of digital values lost to the video signal digitizing due to the presence of the audio signal.

The following table represents the video signal-to-quantizing noise ratio V S/Q and its relative degradation RD for various amplitude ratios AR of the peak-to-peak video signal to the peak-to-peak audio subcarrier signal, together with the (rounded) number N of digital signal levels in the region L of FIG. 7, and hence allocated to the audio subcarrier signal, for an 8-bit coder providing a total of 256 digital signal levels.

| AR (dB) | V S/Q (dB) | RD (dB) | N |
|---|---|---|---|
| Infinite | 48.16 | 0 | 0 |
| 40 | 48.08 | 0.08 | 2 |
| 30 | 47.91 | 0.25 | 8 |
| 20 | 47.34 | 0.82 | 23 |
| 15 | 46.74 | 1.42 | 39 |
| 10 | 45.89 | 2.27 | 62 |

It can be seen from this table that the particular amplitude ratio AR which is used is not critical, but is desirably at least about 15 dB and less than about 40 dB.

The relative degradation RD of the ratio V S/Q is more than completely offset by the dithering effect mentioned above, which typically gives an improvement of 15 to 20 dB in the subjective acceptability of impairments due to quantizing noise in the reproduced video signal. This improvement is believed to occur for the following reason.

The digitization of the video signal results in discrete brightness levels of the digitized waveform, the quantizing noise arising from the resultant steps in the video signal waveform. In a static picture these can manifest themselves as objectionable bands or stripes, because the same quantizing errors occur at the same points in successive lines and frames of the picture. In other words, the quantizing errors are correlated from line to line and frame to frame. The dithering or superposition of the high frequency audio subcarrier signal on the video signal results in the amplitude and phase of the quantizing errors becoming uncorrelated between lines and frames of the picture, so that subjectively the human eye does not notice the brightness variations.

Thus in the coder of FIG. 5 and the decoder of FIG. 6 the quantizing errors are not removed but they are uncorrelated and probablistic for each sample, rather than being deterministic errors as in the prior art. The human eye integrates such errors over a few frames, and hence does not notice the errors, because it has a poor temporal response to small-area low-magnitude changes in luminance.

The increased sampling rate of the coder of FIG. 5, to about 3.75 times the color subcarrier frequency, results in a decreased peak-to-peak amplitude of color subcarrier phase errors due to this sampling, so that even though moving color distortions occur in the reproduced television picture these are substantially unnoticeable. In consequence, locking of the sampling rate to a harmonic of the color subcarrier frequency becomes unnecessary. It has been found that a sampling rate of about 3.5 times to about 4 times the color subcarrier frequency (about 12.5 MHz to about 14.4 MHz for an NTSC video signal with a color subcarrier frequency of about 3.58 MHz) is an acceptable compromise between reduced color distortion and increased bit rate of the digitized signal.

FIG. 8 illustrates an alternative arrangement of parts of the decoder of FIG. 6 for providing baseband video and baseband audio signals on the lines 62 and 70 respectively. The output of the filter 90 on a line 94 is coupled via a 4.5 MHz band stop filter 96 and a buffer amplifier 98 to the line 62. The filter 96 serves as a sound trap to remove the audio subcarrier signal from the video signal, thereby avoiding patterning due to the audio signal which would occur in the reproduced picture if the reproducing television has no sound trap for a baseband video input signal. The signal on the line 94 is also coupled via a 4.5 MHz bandpass filter 100, which passes only the audio subcarrier signal, to a 4.5 MHz frequency discriminator 102 with an associated tank (tuned) circuit. The frequency discriminator 102 produces the baseband audio signal, which is level-compensated and buffered by a buffer amplifier 104 before being supplied to the line 70. In this alternative arrangement, as shown by broken lines optionally the input and output of the filter 100 can be summed with suitable weighting in a buffer amplifier 106 whose output is modulated by the RF modulator 78 to produce the RF output signal on the line 80.

FIG. 9 illustrates a supplementary arrangement for decoding known BTSC encoded stereo audio signals. In this arrangement, the buffer amplifier 104 (FIG. 8) also acts as a 50 kHz low pass filter, and its output on the line 70 is coupled to a BTSC stereo decoder 108 of known form, with an associated 15374 Hz tank circuit. Left and right channel outputs of the decoder 108 are coupled via respective 10 kHz low pass filters 110 and 112 respectively to output lines 114 and 116 respectively.

FIG. 10 illustrates an alternative arrangement of parts of the coder and decoder for accommodating stereo audio signals. In the coder, the summer 88 sums, with appropriate weighting in the same manner as described above, the band limited baseband video signal supplied via the filter 12 from the line 10 with a left audio carrier signal at a frequency f1, produced by a frequency modulator 120 which frequency modulates a left baseband audio signal supplied on a line 24L, and a right audio carrier signal at a frequency f2, produced by a frequency modulator 122 which frequency modulates a right baseband audio signal supplied on a line 24R. The frequencies f1 and f2 are selected to be greater than the video bandwidth of 4.2 MHz and within the bandwidth of the decoder filter 90 and less than the Nyquist frequency of 6.72 MHz. In the decoder, the output of the filter 90 on the line 94 is supplied via bandstop filters 96L and 96R, having bandstop frequencies f1 and f2 respectively, to reproduce the baseband video signal on the line 62, via a left channel bandpass filter 100L having a bandpass frequency of f1 and a corresponding frequency discriminator 102L to the left baseband audio output line 114, and via a right channel bandpass filter 100R having a bandpass frequency of f2 and a corresponding frequency discriminator 102R to the right baseband audio output line 116. As in FIG. 8, buffer amplifiers may be provided to restore the levels of the respective signals, or these may be restored by appropriate weighting of the filters.

A further alternative, not illustrated, would be to modulate the carrier frequencies f1 and f2 of FIG. 10 with sum (left+right) and difference (left−right) audio signals, with only the carrier at the frequency f1 being demodulated for monaural audio signal reproduction.

FIG. 11 illustrates an encoding and multiplexing arrangement for a plurality of N television channels 1 to N, for each of which there is provided a respective coder which is supplied with baseband video and audio subcarrier signals on respective lines, e.g. 10N and 82N for the coder N, and produces on an output line, e.g. 40N, a respective digital signal. Each coder can be as described above for example with reference to FIG. 5, except that the network timing circuit 34 can be omitted therefrom and provided commonly as a network timing circuit 34'. The signals on the lines 401 to 40N are multiplexed synchronously, e.g. by bit or byte interleaving in a multiplexer 120 also controlled by the circuit 34', possibly with other synchronous data supplied via a line 122, to produce a multiplexed digital signal on a line 40' for transmission via a digital signal transmission path of a transmission network by which as already described the circuit 34' is synchronized via the line 36.

Although particular embodiments of the invention have been described in detail, it should be appreciated that numerous modifications, variations, and adaptations may be made thereto without departing from the scope of the invention as defined in the claims.

What is claimed is:

1. A method of converting an analog video signal within a predetermined bandwidth into a digital signal, comprising the steps of:
    combining with the analog video signal a second signal having a frequency greater than the predetermined bandwidth to produce a combined signal; and
    converting into a digital signal samples of the combined signal at a sampling frequency which i at least twice the frequency of the second signal.

2. A method as claimed in claim 1 wherein a peak-to-peak amplitude ratio of the analog video signal to the second signal is at least about 15 dB.

3. A method as claimed in claim 2 wherein said amplitude ratio is at least about 20 dB.

4. A method as claimed in claim 2 wherein said amplitude ratio is less then 40 dB.

5. A method as claimed in claim 3 wherein said amplitude ratio is less than 30 dB.

6. A method as claimed in claim 1 wherein the second signal comprises a carrier which is modulated with an audio signal.

7. A method as claimed in claim 1 wherein the second signal comprises a carrier which is frequency modulated with an audio signal.

8. A method as claimed in claim 7 wherein a peak-to-peak amplitude ratio of the analog video signal to the second signal is at least about 15 dB.

9. A method as claimed in claim 1 wherein the analog video signal includes a color signal component having a predetermined frequency and the sampling frequency is unrelated to the predetermined frequency.

10. A method as claimed in claim 9 wherein the sampling frequency is more than about three times the predetermined frequency.

11. A method as claimed in claim 9 wherein the sampling frequency is at least about 3.5 times the predetermined frequency.

12. A method as claimed in claim 10 and including the step of deriving the sampling frequency from a transmission network via which the digital signal is to be transmitted.

13. A method as claimed in claim 10 and including the steps of transmitting the digital signal via a transmission network and deriving the sampling frequency from the transmission network.

14. A method as claimed in claim 1 and including the step of deriving the sampling frequency from a transmission network via which the digital signal is to be transmitted.

15. A method as claimed in claim 1 and including the steps of transmitting the digital signal via a transmission network and deriving the sampling frequency from the transmission network.

16. A method as claimed in claim 7 wherein a peak-to-peak amplitude ratio of the analog video signal to the second signal is at least about 15 dB, the analog video signal includes a color signal component having a predetermined frequency, and the sampling frequency is more than about three times the predetermined frequency and is unrelated thereto.

17. A method as claimed in claim 16 wherein the analog video signal and the audio signal comprise a composite video signal and a related audio signal of a television channel.

18. A method as claimed in claim 16 wherein the sampling frequency is in a range from about 12.5 MHz to about 14.4 MHz.

19. A method as claimed in claim 16 and including the step of deriving the sampling frequency from a transmission network via which the digital signal is to be transmitted.

20. A method as claimed in claim 16 and including the steps of transmitting the digital signal via a transmission network and deriving the sampling frequency from the transmission network.

21. A method of processing a composite video signal for digital transmission, the signal having a predetermined bandwidth and including a color signal component having a predetermined frequency, comprising the steps of:
    summing the video signal with an audio carrier signal, having a frequency greater than the predetermined bandwidth and having a peak-to-peak amplitude much less than that of the video signal, to produce a summed signal; and
    digitizing samples of the summed signal at a sampling frequency which is at least twice the audio carrier signal frequency and is unrelated to the color signal component frequency.

22. A method as claimed in claim 21 wherein a peak-to-peak amplitude ratio of the video signal to the audio carrier signal is at least about 15 dB.

23. A method as claimed in claim 21 wherein the sampling frequency is more than about three times the color signal component frequency.

24. A method as claimed in claim 21 wherein the video signal is summed with two audio carrier signals each having a respective frequency greater than the predetermined bandwidth, a peak-to-peak amplitude much less than that of the video signal, and being frequency modulated with a respective one of two channels of a stereo audio signal.

25. A method as claimed in claim 21 and including the step of deriving the sampling frequency from a transmission network via which the digitized samples are to be transmitted.

26. A method as claimed in claim 21 and including the steps of transmitting the digitized samples via a transmission network and deriving the sampling frequency from the transmission network.

27. A method as claimed in claim 21 wherein the sampling frequency is at least about 3.5 times the predetermined frequency.

28. A video coder comprising:
 means for supplying a composite video signal within a predetermined bandwidth;
 means for supplying a carrier signal modulated with an audio signal, the carrier signal having a frequency greater than the predetermined bandwidth;
 means for summing the video signal with the carrier signal with a peak-to-peak amplitude ratio of the video signal to the carrier signal of at least about 15 dB to produce a summed signal; and
 means for converting the summed signal into a digital signal with digitized samples at a sampling frequency of at least twice the carrier signal frequency.

29. A video coder as claimed in claim 28 wherein the means for converting comprises means for deriving a signal at the sampling frequency from a transmission network for transmission of the digital signal.

30. A video decoder for decoding a digital signal comprising digitized samples of a summed signal comprising a composite video signal within a predetermined bandwidth summed with an audio carrier signal having a frequency greater than the predetermined bandwidth and a peak-to-peak amplitude much less than that of the composite video signal, the samples occurring at a sampling frequency which is at least twice the audio carrier signal frequency, the decoder comprising:
 means for converting the digitized samples into analog signal samples at the sampling frequency;
 means for low pass filtering the analog signal samples to produce an analog signal; and
 means for increasing the peak-to-peak amplitude of components of the analog signal at the audio carrier signal frequency relative to the peak-to-peak amplitude of components of the analog signal at frequencies within the predetermined bandwidth.

31. A method of transmitting via a digital transmission path a video signal including a color signal component having a predetermined first frequency, the video signal and the first frequency being within a predetermined bandwidth, comprising the steps of:
 combining the video signal with a second signal having a second frequency greater than the predetermined bandwidth to produce a combined signal;
 sampling the combined signal at a third frequency related to a transmission rate on the digital transmission path;
 converting samples of the combined signal into a digital signal; and
 transmitting the digital signal via the digital transmission path;
 wherein the third frequency is more than about three times the first frequency and at least twice the second frequency.

32. A method as claimed in claim 31 wherein the second signal comprises a carrier which is frequency modulated with an audio signal.

33. A method as claimed in claim 31 wherein a peak-to-peak amplitude ratio of the video signal to the second signal is at least about 15 dB.

34. A method of processing a plurality of video signals for transmission via a digital transmission path, each video signal including a color subcarrier having a first frequency, comprising the steps of:
 sampling each video signal at a frequency synchronously related to a transmission rate on the digital transmission path;
 converting samples of the video signals into digital signals; and
 synchronously multiplexing the digital signal samples of the video signals for transmission via the digital transmission path;
 wherein the frequency synchronously related to a transmission rate on the digital transmission path is more than about three times the first frequency.

35. A method as claimed in claim 34 wherein each video signal comprises a composite video signal of a respective television channel, the method further comprising the step of summing with each video signal, before the sampling thereof, at least one frequency modulated audio carrier signal of the respective television channel.

36. A method as claimed in claim 35 wherein a peak-to-peak ratio of each composite video signal to the frequency modulated audio carrier signal with which it is summed is at least about 15 dB.

* * * * *